US011090561B2

(12) United States Patent
Cahill et al.

(10) Patent No.: US 11,090,561 B2
(45) Date of Patent: Aug. 17, 2021

(54) ALIGNING LOCATION FOR A SHARED AUGMENTED REALITY EXPERIENCE

(71) Applicant: Microsoft Technology Licensing, LLC, Redmond, WA (US)

(72) Inventors: Jason Matthew Cahill, Woodinville, WA (US); Torfi Frans Olafsson, Kirkland, WA (US); Jesse Dylan Merriam, Bothell, WA (US); Michael Meincke Persson, Redmond, WA (US); Bradley Reid Shuber, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 136 days.

(21) Appl. No.: 16/277,591

(22) Filed: Feb. 15, 2019

(65) Prior Publication Data

US 2020/0261799 A1     Aug. 20, 2020

(51) Int. Cl.
*A63F 13/50* (2014.01)
*A63F 13/98* (2014.01)
(Continued)

(52) U.S. Cl.
CPC .............. *A63F 13/50* (2014.09); *A63F 13/98* (2014.09); *G06T 7/74* (2017.01); *H04L 67/38* (2013.01); *H04W 4/023* (2013.01)

(58) Field of Classification Search
CPC .. A63F 13/50; A63F 13/98; A63F 9/24; A63F 13/00; G06T 7/74; G06T 19/006;
(Continued)

(56) References Cited

U.S. PATENT DOCUMENTS 8,493,353 B2   7/2013   Blanchflower et al.
9,292,164 B2   3/2016   Goldman et al.
(Continued)

FOREIGN PATENT DOCUMENTS

| CN | 106980847 A | 7/2017 |
| EP | 2348383 A1 | 7/2011 |
| KR | 101690311 B1 | 1/2017 |

OTHER PUBLICATIONS

"SwiftShot: Creating a Game for Augmented Reality", Retrieved From: https://web.archive.org/web/20190119151716/https://developer.apple.com/documentation/arkit/swiftshot_creating_a_game_for_augmented_reality, Jan. 19, 2019, 4 Pages.
(Continued)

*Primary Examiner* — William H McCulloch, Jr.
*Assistant Examiner* — Ankit B Doshi
(74) *Attorney, Agent, or Firm* — Rainier Patents, P.S.

(57) ABSTRACT

Described herein is a system and method for creating a shared coordinate space in an augmented reality session between two devices with disjoint relative coordinate spaces. With AR tracking initiated, each device has its own relative coordinate space. A spatial alignment image can be recognized by a device joining an AR session which records its location (e.g., six degrees of position). The joining device can utilize an obtained location of an inviting device at or about the time the spatial alignment image was recognized, and, a spatial origin of the inviting device, to calculate an offset between the joining device and the inviting device, establishing a shared coordinate space between the joining device and the inviting device.

20 Claims, 8 Drawing Sheets

(51) Int. Cl.
*G06T 7/73* (2017.01)
*H04L 29/06* (2006.01)
*H04W 4/02* (2018.01)

(58) Field of Classification Search
CPC ... G06T 2207/10028; G06T 7/20; G06T 7/70; H04L 67/38; H04W 4/023; G06F 3/011; G06F 3/017; G09G 2320/0261
See application file for complete search history.

(56) References Cited

U.S. PATENT DOCUMENTS

| | | |
|---|---|---|
| 9,604,131 B1 | 3/2017 | Kiyohara et al. |
| 9,613,448 B1 | 4/2017 | Margolin |
| 9,754,397 B1 | 9/2017 | Piemonte et al. |
| 10,105,601 B1 | 10/2018 | Hariton |
| 2011/0216002 A1 | 9/2011 | Weising et al. |
| 2013/0194304 A1 | 8/2013 | Latta et al. |
| 2013/0244776 A1 | 9/2013 | Everly et al. |
| 2013/0293580 A1 | 11/2013 | Spivack |
| 2014/0128161 A1 | 5/2014 | Latta et al. |
| 2014/0204077 A1 | 7/2014 | Kamuda et al. |
| 2014/0297617 A1 | 10/2014 | Rajakarunanayake et al. |
| 2014/0298382 A1 | 10/2014 | Jo et al. |
| 2014/0375688 A1 | 12/2014 | Redmann et al. |
| 2017/0076499 A1 | 3/2017 | Jiang et al. |
| 2017/0085656 A1 | 3/2017 | Abbott et al. |
| 2017/0115626 A1 | 4/2017 | Wei |
| 2017/0169617 A1 | 6/2017 | Rodriguez |
| 2017/0352186 A1 | 12/2017 | Dauphiny |
| 2018/0321894 A1 | 11/2018 | Paulovich et al. |
| 2018/0361248 A1 | 12/2018 | Nomura et al. |
| 2018/0374269 A1* | 12/2018 | Smith .................. G06K 7/1417 |
| 2019/0114802 A1 | 4/2019 | Lazarow |
| 2020/0360823 A1 | 11/2020 | Cahill et al. |

OTHER PUBLICATIONS

Amadeo, Ron, "Google's ARCore 1.2 enables Multiplayer AR Scross Android and iOS", Retrieved From: https://arstechnica.com/gadgets/2018/05/google-arcore-1-2-enables-shared-ar-experiences-across-android-and-ios/, May 9, 2018, 6 Pages.

"International Search Report & Written Opinion issued in PCT Application No. PCT/US20/015992", dated May 25, 2020, 13 Pages.

"Geo Location Based Augmented Reality Apps", Retrieved from <<https://www.juegostudio.com/blog/geo-location-based-augmented-reality-apps>>, Jun. 6, 2018, 6 Pages.

Kounavis, et al., "Enhancing the Tourism Experience through Mobile Augmented Reality: Challenges and Prospects", In International Journal of Engineering Business Management, Jan. 1, 2012, 6 Pages.

Montero, et al., "Towards an augmented reality fourth generation social networks", In Journal of Computing Research Repository, May 13, 2017, 5 Pages.

Microsoft, "Coordinate Systems", retrieved from: https://docs.microsoft.com/en-us/windows/mixed-reality/coordinate-systems on Feb. 15, 2019, 9 pages.

"Non Final Office Action Issued in U.S. Appl. No. 16/414,591", dated Nov. 17, 2020, 9 Pages.

Fiala, Mark, "ARTag Revision 1. A Fiducial Marker System Using Digital Techniques", Retrieved from: https://www.cs.cmu.edu/afs/cs/project/skinnerbots/Wiki/AprilTags/NRC-47419.pdf, Nov. 1, 2004, 48 Pages.

"International Search Report and Written Opinion Issued in PCT Application No. PCT/US20/027871", dated Aug. 6, 2020, 13 Pages.

* cited by examiner

ALIGNING LOCATION FOR A SHARED AUGMENTED REALITY EXPERIENCE

BACKGROUND

Augmented reality (AR) systems such as video games display real world images overlaid with a virtual experience (e.g., interactive three-dimensional object(s)). An AR system thus enables a participant to view real-world imagery in combination with context-relevant, computer-generated imagery. Imagery from the real-world and the computer-generated are combined and presented to a user such that they appear to share the same physical space. In AR applications in which multiple participants share the same physical environment, inconsistent positioning of the computer-generated imagery relative to the real-world imagery can be a noticeable distraction that degrades the AR experience.

SUMMARY

Described herein is a system for creating a shared coordinate space in an augmented reality session between a first user gaming device and a second user gaming device, comprising: a computer comprising a processor and a memory having computer-executable instructions stored thereupon which, when executed by the processor, cause the computer to: by the second user gaming device: perform augmented reality tracking to establish a relative coordinate space of the second user gaming device; recognize a spatial alignment image displayed on the first user gaming device and receive an identifier of the augmented reality session; record a location of the second user gaming device within the coordinate space of the second user gaming device and a timestamp associated with a clock of the second user gaming device associated with recognition of the spatial alignment image; send a request for information to the first user gaming device, the request including the timestamp; in response to the request, receive information from the first user gaming device comprising the first user gaming device's location within a relative coordinate space of first user gaming device at or about the timestamp, and, a spatial origin of the first user gaming device; calculate an offset between the coordinate space of the second user gaming device and the coordinate space of the first user gaming device to create the shared coordinate space based, at least in part, upon the received information; and utilize the shared coordinate space and the identifier to display the augmented reality session.

Also described herein is a method of creating a shared coordinate space in an augmented reality session between a first user gaming device and a second user gaming device, each initially with disjoint relative coordinate spaces, comprising: by the first user gaming device and the second user gaming device, performing augmented reality tracking to establish separate relative coordinate spaces of the first user gaming device and the second user gaming device; by the first user gaming device, providing an identifier of the augmented reality session; by the first user gaming device, displaying a spatial alignment image; by the first user gaming device, storing location information regarding the first user gaming device and associated timestamps for at least a portion of a time the spatial alignment image is displayed; by the second user gaming device, recognizing the spatial alignment image displayed on the first user gaming device and receiving the identifier of the augmented reality session; by the second user gaming device, recording a location of the second user gaming device within the coordinate space of the second user gaming device and a timestamp associated with a clock of the second user gaming device associated with recognition of the spatial alignment image; by the second user gaming device, sending a request for information to the first user gaming device, the request including the timestamp; by the first user gaming device, receiving the request for information from the second user gaming device, the request including a timestamp; by the first user gaming device, in response the request, providing location information regarding the first user gaming device at or about the timestamp; by the second user gaming device, in response to the request, receiving information from the first user gaming device comprising the first user gaming device's location within a relative coordinate space of first user gaming device at or about the timestamp and, a spatial origin of the first user gaming device; by the second user gaming device, calculating an offset between the coordinate space of the second user gaming device and the coordinate space of the first user gaming device to create the shared coordinate space based, at least in part, upon the received information; and, by the second user gaming device, utilizing the shared coordinate space and the identifier to display the augmented reality session.

Described herein is a computer storage media storing computer-readable instructions that when executed cause a computing device to: by a first user gaming device: perform augmented reality tracking to establish a relative coordinate space of the first user gaming device; display a spatial alignment image; provide an identifier of an augmented reality session; store location information regarding the first user gaming device and associated timestamps for at least a portion of a time the spatial alignment image is displayed; receive a request for information from the second user gaming device, the request including a timestamp; and, in response the request, provide location information regarding the first user gaming device at or about the timestamp and, a spatial origin of the first user gaming device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Various technologies pertaining to aligning location for a shared augmented reality experience are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding aligning location for a shared augmented reality experience. What follows are one or more exemplary systems and methods.

Aspects of the subject disclosure pertain to the technical problem of aligning location for a shared augmented reality experience. The technical features associated with addressing this problem involve creating a shared coordinate space in an augmented reality session between a first user gaming device and a second user gaming device, each initially with disjoint relative coordinate spaces using a displayed spatial alignment image and an AR session identifier. Accordingly, aspects of these technical features exhibit technical effects of more efficiently and effectively establishing a shared coordinate space for a plurality of AR devices.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems, etc.) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

"User gaming device" refers to a moveable individual computing device including, for example, a mobile phone, a laptop, a tablet, a phablet, a personal digital assistant ("PDA"), an e-reader, a wearable computer, a head-mounted display (HMD), or any other moveable computing device having components for displaying and/or interacting with an augmented reality session. A "real object" is one that exists in an AR participant's surroundings. A "virtual object" is a computer-generated construct that does not exist in the participant's physical surroundings, but may be experienced (e.g., seen, heard, etc.) via the AR technology.

AR systems such as video games display real world images overlaid with a virtual experience (e.g., interactive three-dimensional object(s)). An AR system thus enables a participant to view real-world imagery in combination with context-relevant, computer-generated imagery. Aligning user gaming devices to enable a shared AR experience can be a complex problem which frequently results in inconsistent positioning of the computer-generated imagery relative to the real-word imagery.

Described herein is a system and method for creating a shared coordinate space in an augmented reality session between at least two devices with disjoint relative coordinate spaces. Initially, the two devices synchronize their clocks (e.g., to each other and/or to a network time server) and separately begin AR tracking. With AR tracking initiated, each device establishes its own relative coordinate space.

During an AR session, a first device displays a spatial alignment image, and optionally an AR session identifier of the AR session, which are viewable to a second device. While displaying the spatial alignment image, the first device tracks its location (e.g., six degrees of position) and at various time intervals using timestamps. The second device recognizes the spatial alignment image and records its location (e.g., six degrees of position) and timestamp of when the spatial alignment image is recognized (e.g., timestamp coinciding with location when the spatial alignment is recognized). "Six degrees of position" (also referred to as "six degrees of freedom") refers to freedom of movement of an object in three-dimensional space along three orthogonal spatial axes (e.g., x, y, and z) and a change in object orientation about three orthogonal rotation axes (e.g., yaw, pitch, and roll).

Thereafter, the second device sends a request for information to the first device, along with the timestamp of when the second device recognized the spatial alignment image. In response to the request, the first device sends to the second device the first device's location (e.g., six degrees of position) at or about the timestamp when the second device recognized the spatial alignment image, and, a spatial origin of the first device.

Using the received location and spatial origin of the first device, the second device can calculate an offset between the second device and the first device, establishing a shared coordinate space between the first device and the second device. The second device can then display virtual image(s) of the AR session being displayed by the first device in the shared coordinate space. In some embodiments, the shared coordinate space can be correct to within millimeter accuracy, that is, the second device can align its coordinate space with the coordinate space of the first device within accuracy of about a millimeter.

Figure 1:
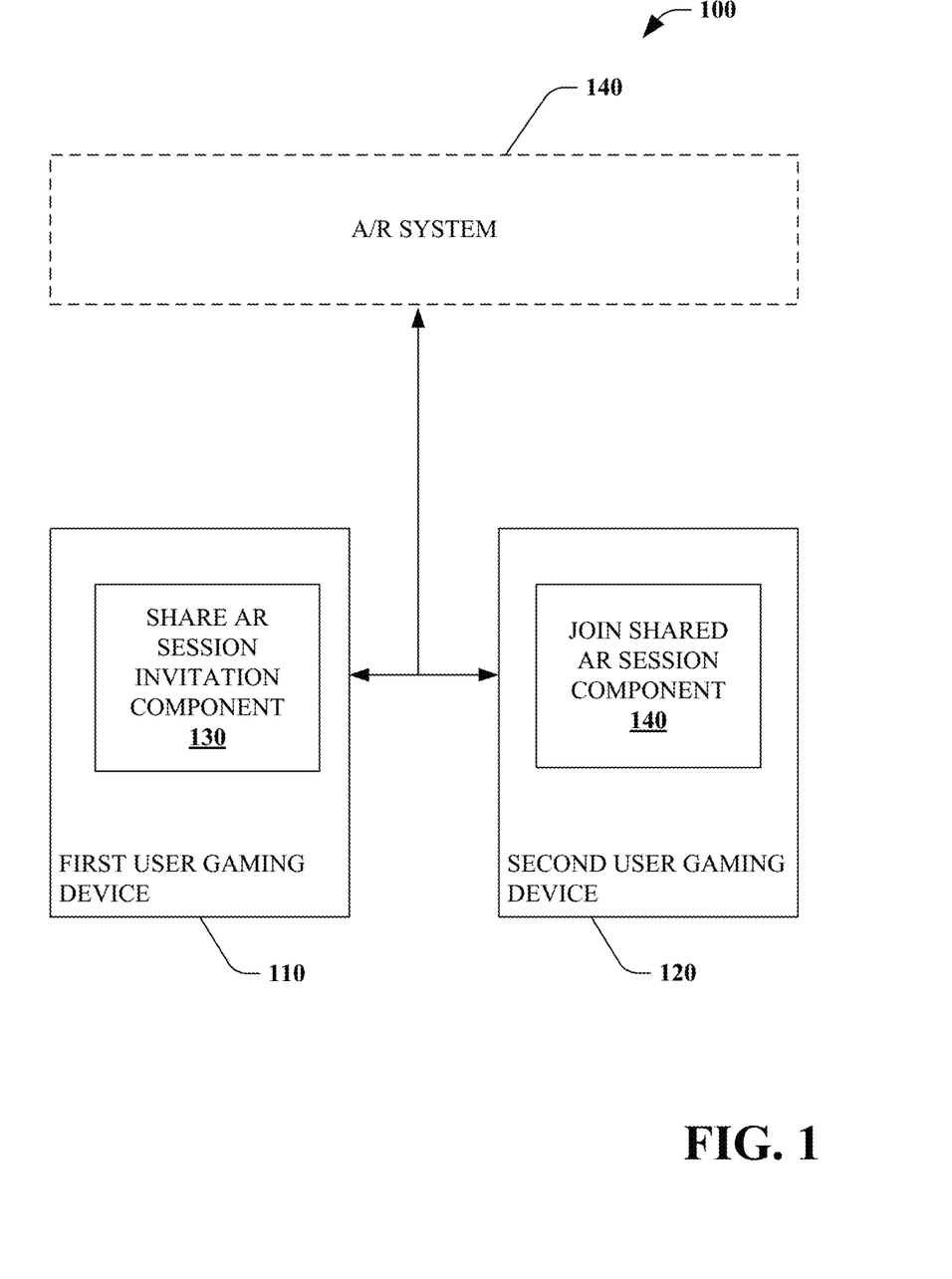
FIG. 1 is a functional block diagram that illustrates a system for creating a shared coordinate space in an augmented reality session between at least two devices with disjoint relative coordinate spaces.

Referring to FIG. 1, a system for creating a shared coordinate space in an augmented reality session between at least two devices (with disjoint relative coordinate spaces) 100 is illustrated. The system 100 can facilitate a first user gaming device 110 sharing an AR session initially hosted on the first user gaming device 110 with one or more second user gaming device(s) 120. The first user gaming device 110 and the second user gaming device 120 are coupled to each other, for example, using a high-speed wireless network connection.

In some embodiments, the system 100 can overcome constraints of some conventional shared AR session systems that utilize a stationary reference object to spatially anchor user gaming devices in a shared AR session. By utilizing a stationary reference object, mobility of AR session users can be severely limited. For example, users are not free to roam through a park and decide to participate in a shared AR session. Further, many conventional shared AR systems lack the ability to spatially locate the user gaming devices with precision, resulting in inconsistent positioning of computer-generated imagery relative to the real-world imagery and a less enjoyable shared AR session.

The first user gaming device 110 includes a share AR session invitation component 130 that provides information regarding the particular AR session and a coordinate space of the first user gaming device 110 to the second user gaming device 120. The second user gaming device 120 includes a join shared AR session component 140 that coordinates communication with the first user gaming device 110 to create a shared coordinate space with the first user gaming device 110, for example, by aligning the coordinate space of the second user gaming device 120 to the coordinate space of the first user gaming device 110.

In order to share an AR session, clocks of the first user gaming device 110 and the second user gaming device 120 can be synchronized. In some embodiments, clocks of the first user gaming device 110 and the second user gaming device 120 are synchronized to each other. In some embodiments, clocks of the first user gaming device 110 and the second user gaming device 120 are synchronized to an AR system 150 (e.g., a local AR system and/or a cloud-based AR system). In some embodiments, clocks of the first user gaming device 110 and the second user gaming device 120 are synchronized to a network time server (not shown).

The first user gaming device 110 and the second user gaming device 120 separately begin AR tracking (e.g., identifying feature points) such that each user gaming device 110, 120 has its own relative coordinate space. For example, the first user gaming device 110 has its own spatial origin (e.g., 0, 0, 0 of a three-dimensional Cartesian coordinate system) and the second user gaming device 120 has its own spatial origin (e.g., 0, 0, 0 of another three-dimensional Cartesian coordinate system). In some embodiments, coordinates are expressed as Cartesian coordinates (X,Y,Z). In some embodiments, coordinates are expressed as or global coordinates (latitude, longitude, height).

A user of the first user gaming device 110 can place virtual object(s) and/or virtual encounter(s) within an AR session. Thereafter, the user of the first user gaming device 110 can initiate sharing of the AR session with a user of the second user gaming device 120. The first user gaming device 110 and the second user gaming device 120 can share information regarding respective users (e.g., player identifier) either directly and/or through the AR system 150.

The share AR session invitation component 130 can display a spatial alignment image on the first user gaming device 110 viewable by the second user gaming device 120. The user of the first user gaming device 110 can further provide an AR session identifier to the user of the second user gaming device 120 to identify the particular AR session. In some embodiments, the AR session identifier can be a globally unique identifier (e.g., GUID). In some embodiments, the AR session identifier can be a multi-dimensional barcode (e.g., a quick response or "QR" code, Aztec code, a data matrix code, a dataglyph, a MaxiCode, a PDF417 code, an Ultra Code, a UCC RSS-2D bar code, and/or other optical code) displayed on the first user gaming device 110 by the share AR session invitation component 130 and viewable by the second user gaming device 120. In some embodiments, the AR session identifier can be electronically communicated from the first user gaming device 110 to the second user gaming device 120, for example, based upon express user input (e.g., share AR session identifier command) and/or received electronically based upon proximity of the first user gaming device 110 to the second user gaming device 120 and display of the spatial alignment image on the first user gaming device 110.

Figure 2:
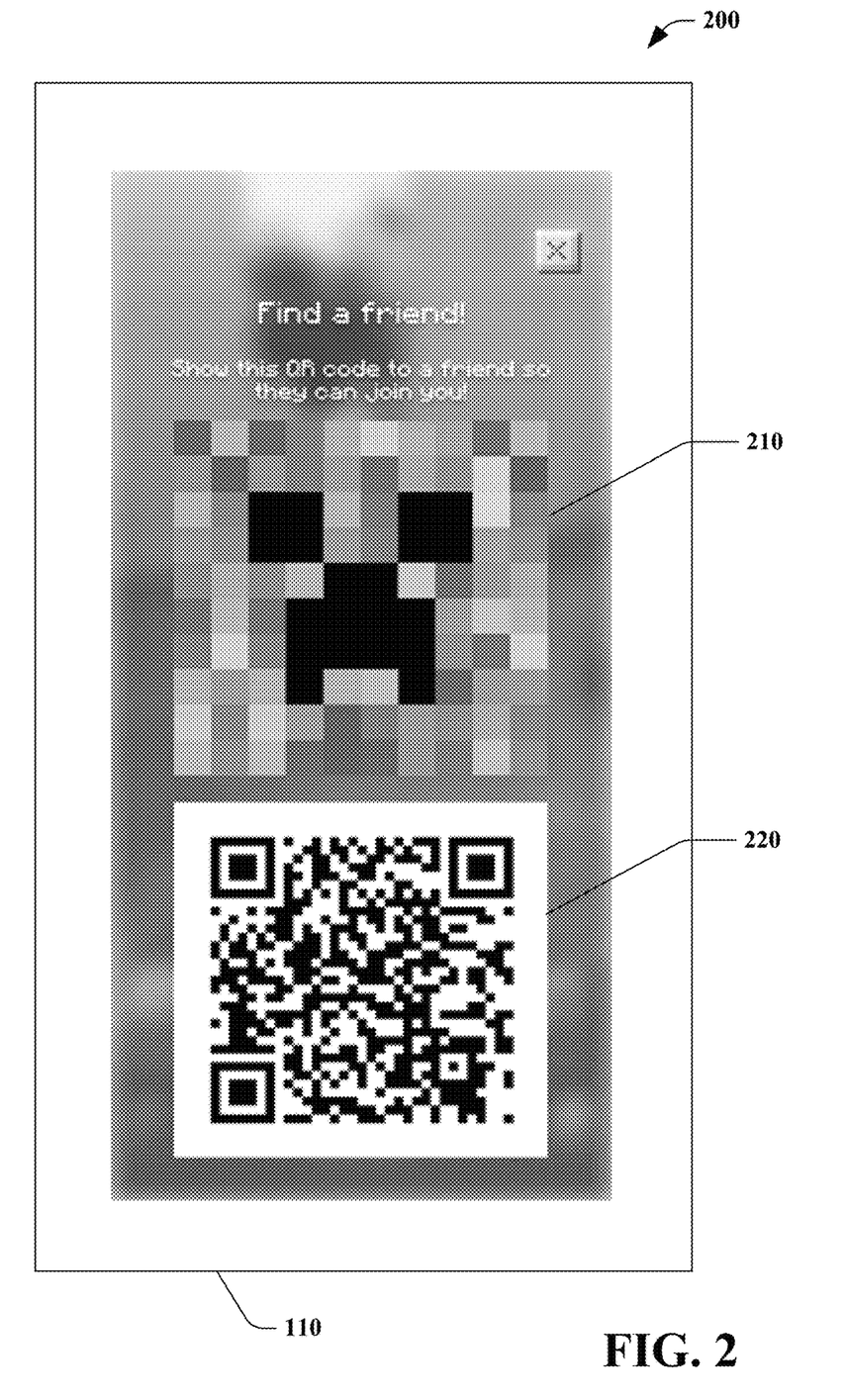
FIGS. 2 and 3 are exemplary user interfaces.

Turning briefly to FIG. 2, an exemplary user interface 200 displayed on the first user gaming device 110 is illustrated. The user interface 200 includes a spatial alignment image 210 that allows a second user gaming device 120 to determine its location relative to the first user gaming device 110. In some embodiments, the spatial alignment image 210 is displayed at a predetermined size and with a plurality of features (e.g., predefined specific groupings of pixels of predefined colors and/or predefined intensity(ies)) that allow the second user gaming device 120 to determine its location/position (e.g., six degrees of position) relative to the first user gaming device 110. The user interface 200 further include a multi-dimensional barcode 220 that uniquely identifies a particular AR session (e.g., identifier).

Referring back to FIG. 1, while displaying the spatial alignment image, the share AR session invitation component 130 tracks (e.g., stores) location information regarding the first user gaming device 110 (e.g., information regarding six degrees of position of the first user gaming device) at various time intervals using timestamps (e.g., associated with each of the locations of the first user gaming device 110).

In some embodiments, the second user gaming device 120 can infer a user's desire to initiate joining of the AR session. For example, based, at least in part, upon proximity of the second user gaming device 120 to the first user gaming device 110, the join shared AR session component 140 can infer the user's desire to initiate joining of the AR session.

Figure 3:
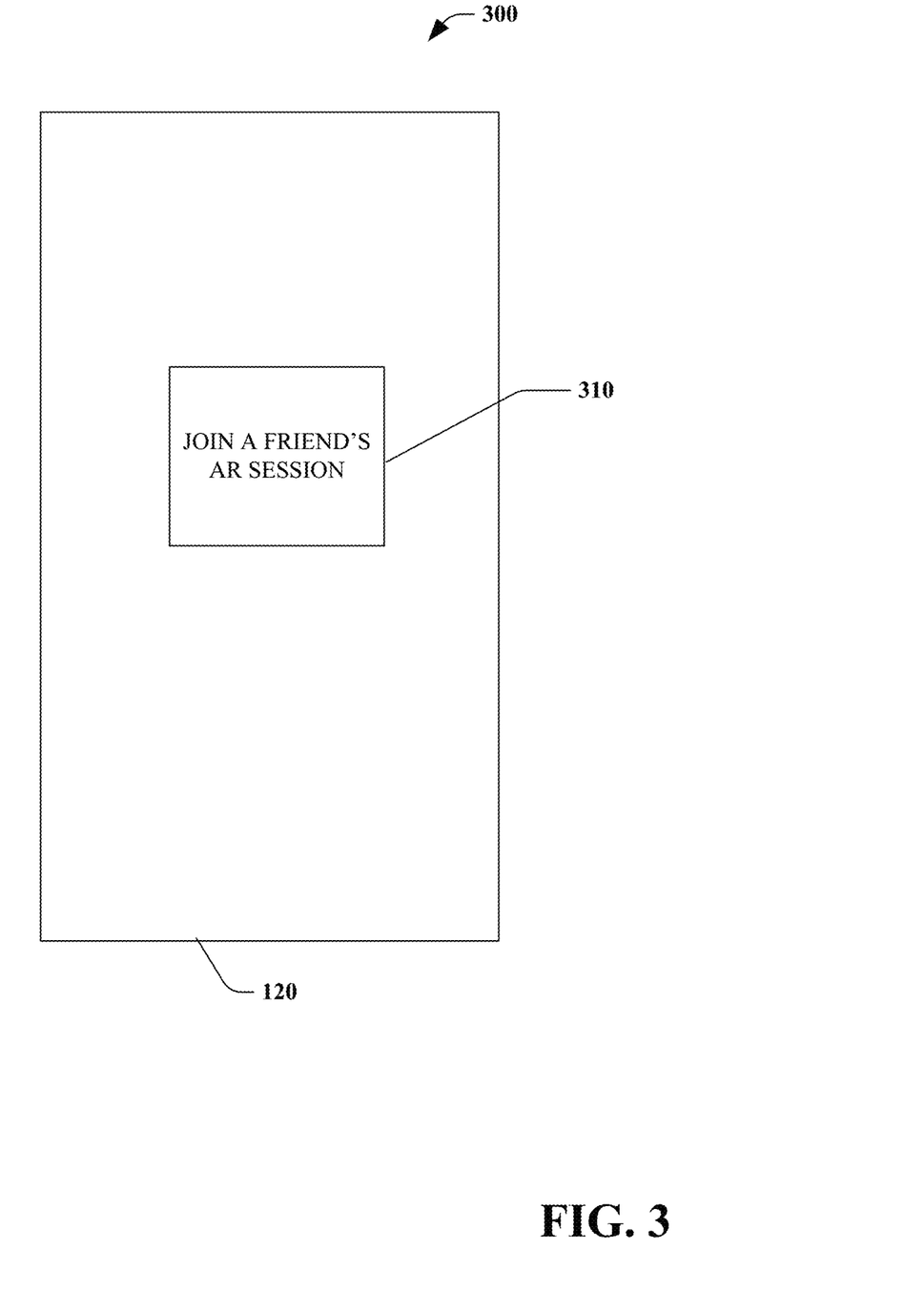

In some embodiments, the user of the second user gaming device 120 can expressly initiate joining of the AR session. Turning briefly to FIG. 3, an exemplary user interface 300 includes a "join a friend's AR session" control 310 selection of which causes the join shared AR session component 140 to initiate joining of the AR session.

Referring back to FIG. 1, the join shared AR session component 140 of the second user gaming device 120 can utilize the displayed spatial alignment image (e.g., using one or more cameras (not shown) of the second user gaming device 120) to spatially link the second user gaming device 120 to the first user gaming device 110. The join shared AR session component 140 can record location information (e.g., six degrees of position) and a timestamp of when the second user gaming device 120 was spatially linked to the first user gaming device 110 (e.g., location and timestamp of when the spatial alignment image was recognized).

Thereafter, the second user gaming device 120 sends a request for information to the first user gaming device 110, along with the timestamp of when the spatial linked by the second user gaming device 120 occurred. In response to the request, the first user gaming device 110 sends to the second user gaming device 120 the location (e.g., six degrees of position) of the first user gaming device 110 at or about the timestamp when the second user gaming device 120 was spatially linked to the first user gaming device 110, and, a spatial origin of the first user gaming device.

Using the received location and spatial origin of the first user gaming device 120, along with the spatial origin of the second user gaming device 120, and the recorded location of the second user gaming device 120 when the second user gaming device 120 was spatially linked to the first user gaming device 110, the join shared AR session component 140 can calculate an offset between the second user gaming device 120 and the first user gaming device 110. The join shared AR session component 140 can utilize the calculated offset to establish a shared coordinate space between the first user gaming device 110 and the second user gaming device 120 by aligning the coordinate space of the second user gaming device 120 to the coordinate space of the first user gaming device 110.

The second user gaming device 120 and the first user gaming device 110 can then both display and/or interact with virtual image(s) of the AR session in the shared coordinate space. Once the shared coordinate space has been established, each user gaming device 110, 120 provides current location and interaction information to the other device(s), and/or to the AR system 150.

The system 100 can thus allow two or more user gaming devices to aligns their respective views of a same virtual object such that the virtual object has a same orientation regardless of perspective (e.g., viewed from any of the two or more user gamine devices). In some embodiments, the system 100 can be utilized to subsequently share the AR session with a plurality of other user gaming devices, with each of the plurality of other user gaming devices aligning their respective coordinate space with the coordinate space of the first user gaming device 110.

In some embodiments, the system 100 can be utilized as part of a multi-player AR gaming experience. For example, the AR gaming experience can allow a first user to begin building a virtual object or scene comprising a plurality of virtual objects utilizing virtual building blocks. The first user can utilize the system 100 to share the AR gaming experience with one or more other users by providing an AR session identifier and displaying a spatial alignment image viewable by user gaming devices of the other users (e.g., simultaneously viewable and/or sequentially viewable). In this manner, a plurality of users can concurrently participate in building the same virtual object or scene such that all users see the same virtual object or scene in the same orientation making for a precise and immersive multi-player AR gaming experience.

In some embodiments, the system 100 can be utilized to "anchor" a virtual object in a highly changing environment such as a household tabletop. That is, the system 100 can coordinate spatial alignment locking of the devices irrespective of characteristics of the physical environment.

In some embodiments, both the first user gaming device 110 and the second user gaming device 120 each include the share AR session invitation component 130 and the join shared AR session component 140. In this manner, each has the ability to initiate an invitation to join the shared AR session, and, to join the shared AR session.

For purposes of explanation and not limitation, the system 100 has been discussed with reference to a spatial alignment image utilized by the join shared AR session component 140 of the second user gaming device 120 to determine a spatial position of the second user gaming device 120 relative to the first user gaming device 110. In some embodiments, a spatial sound can be utilized in place of the spatial alignment image to facilitate the join shared AR session component 140 in determining the spatial position of the second user gaming device 120 relative to the first user gaming 120.

Figure 4:
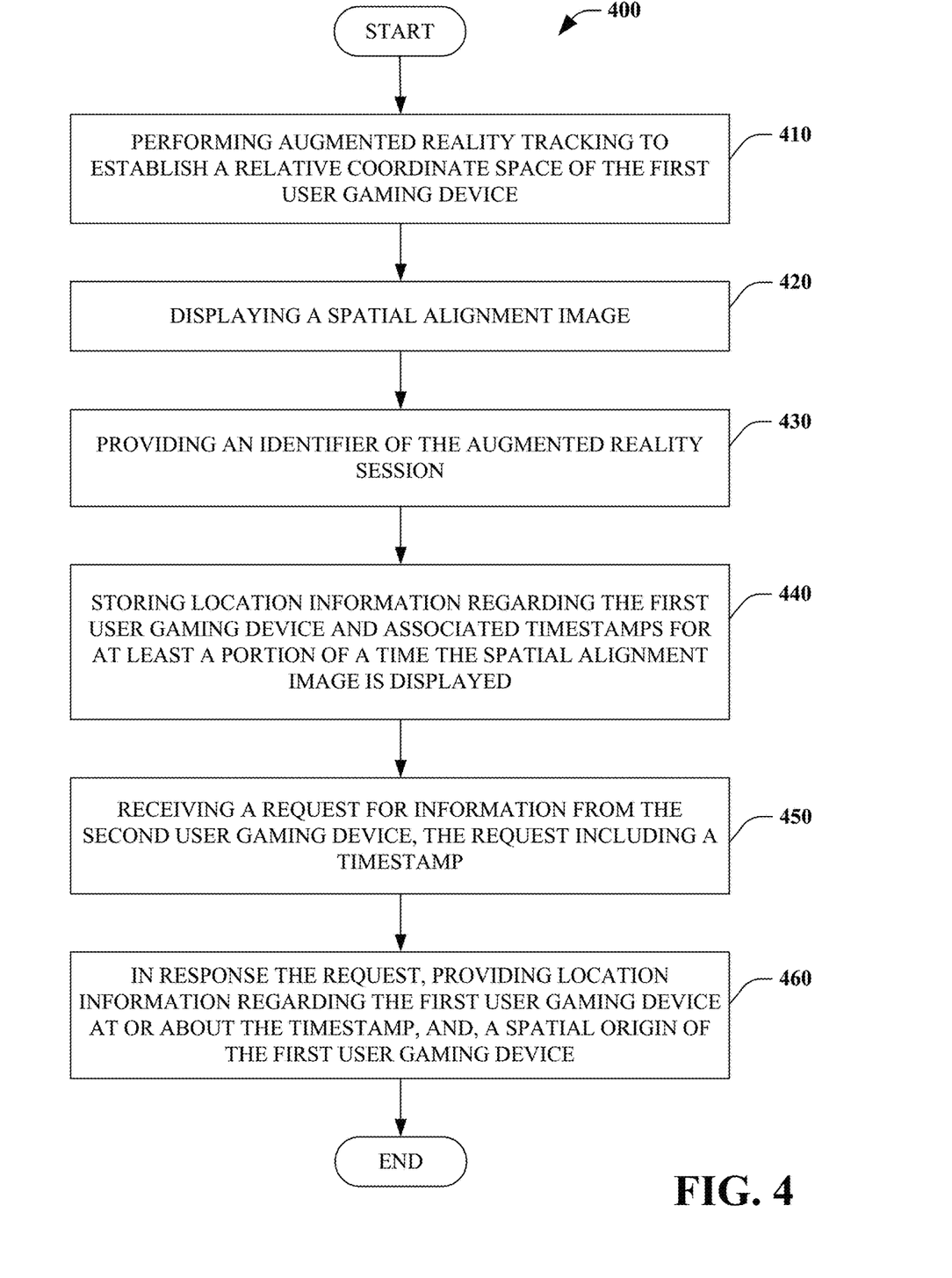
FIG. 4 is a flow chart that illustrates a method of creating a shared coordinate space in an augmented reality session between at least two devices with disjoint relative coordinate spaces by a first user gaming device.
Figure 5:
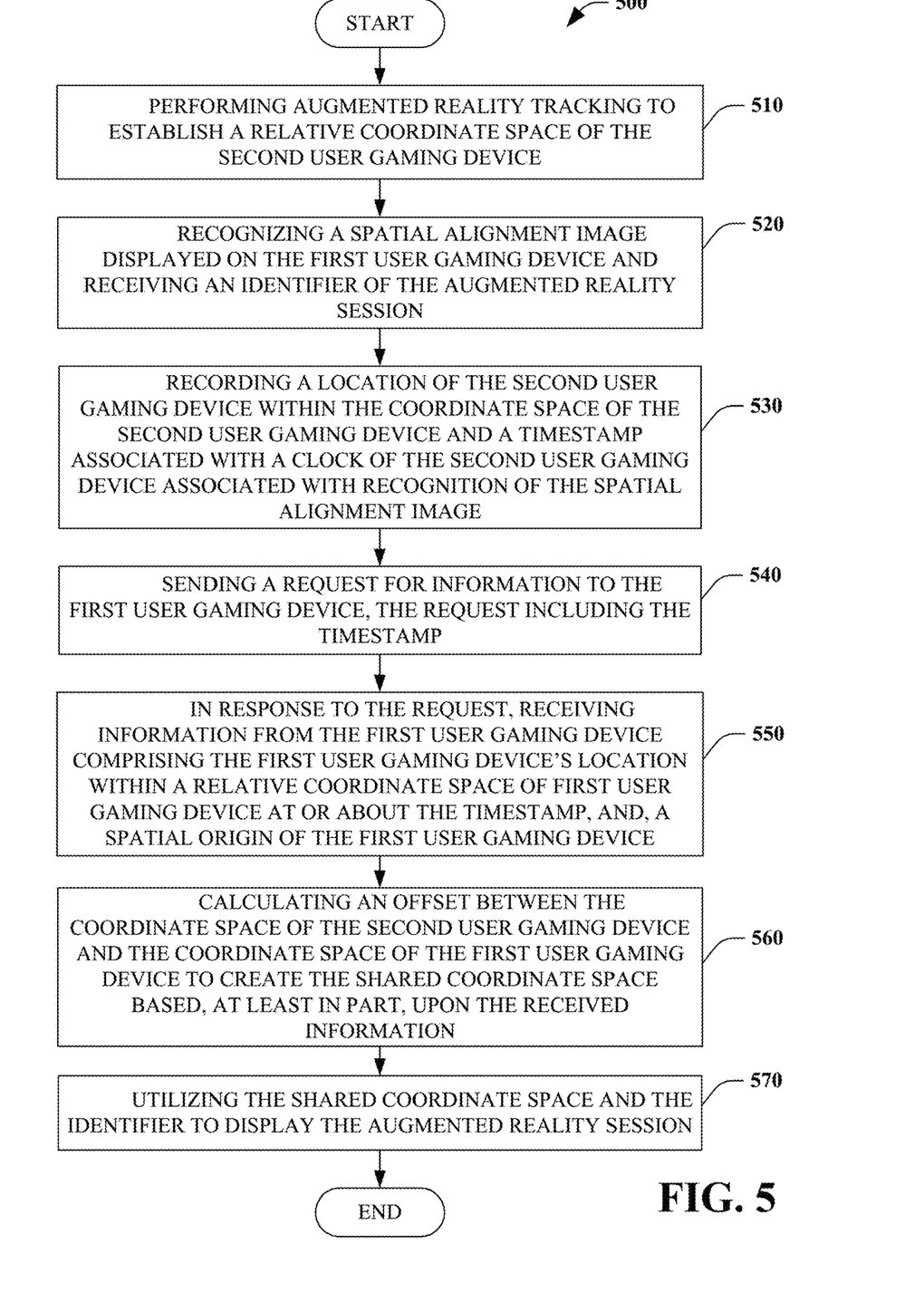
FIG. 5 is a flow chart that illustrates a method of creating a shared coordinate space in an augmented reality session between at least two devices with disjoint relative coordinate spaces by second first user gaming device.
Figure 6:
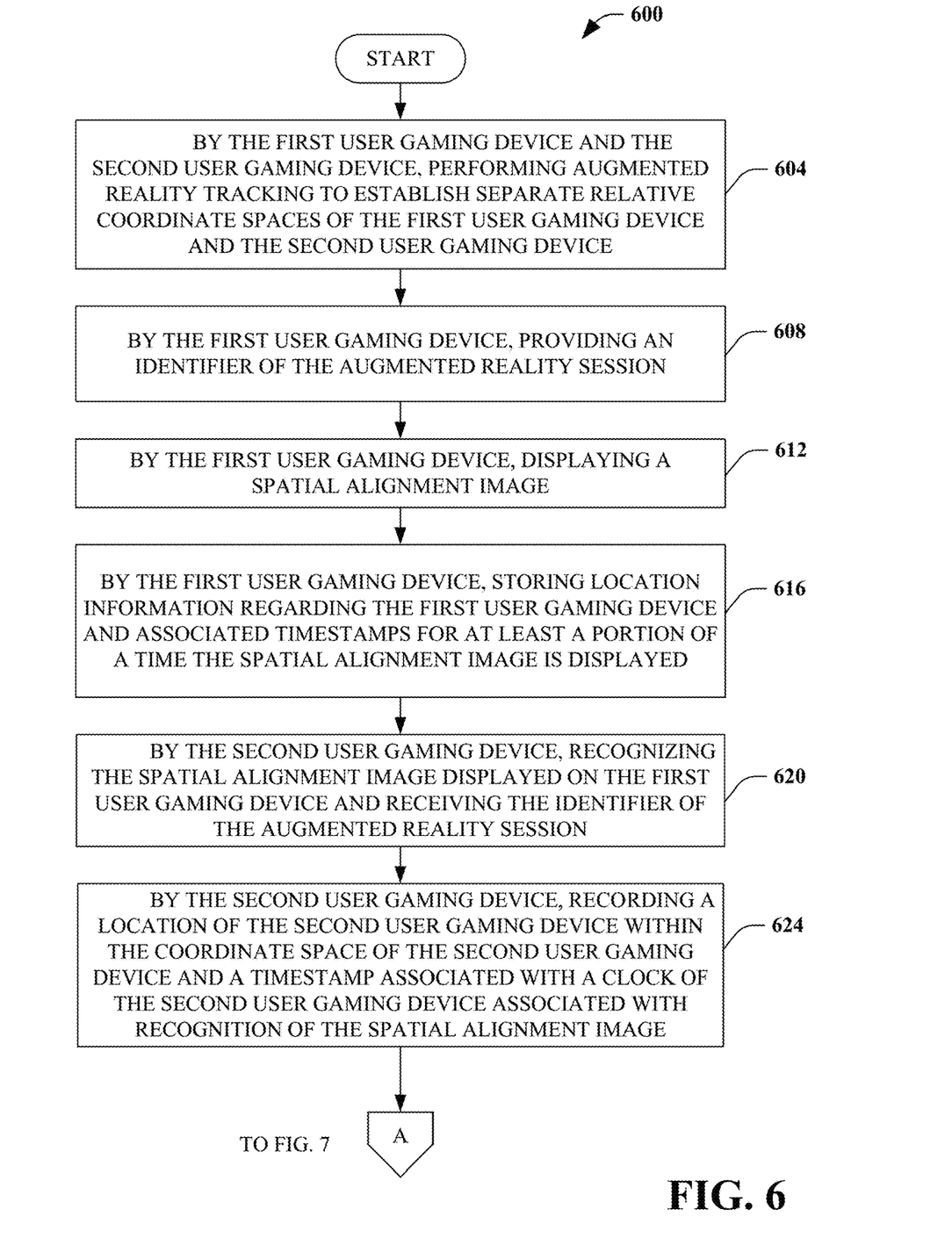
FIGS. 6 and 7 are flow charts that illustrate a method of creating a shared coordinate space in an augmented reality session between at least two devices with disjoint relative coordinate spaces.
Figure 7:
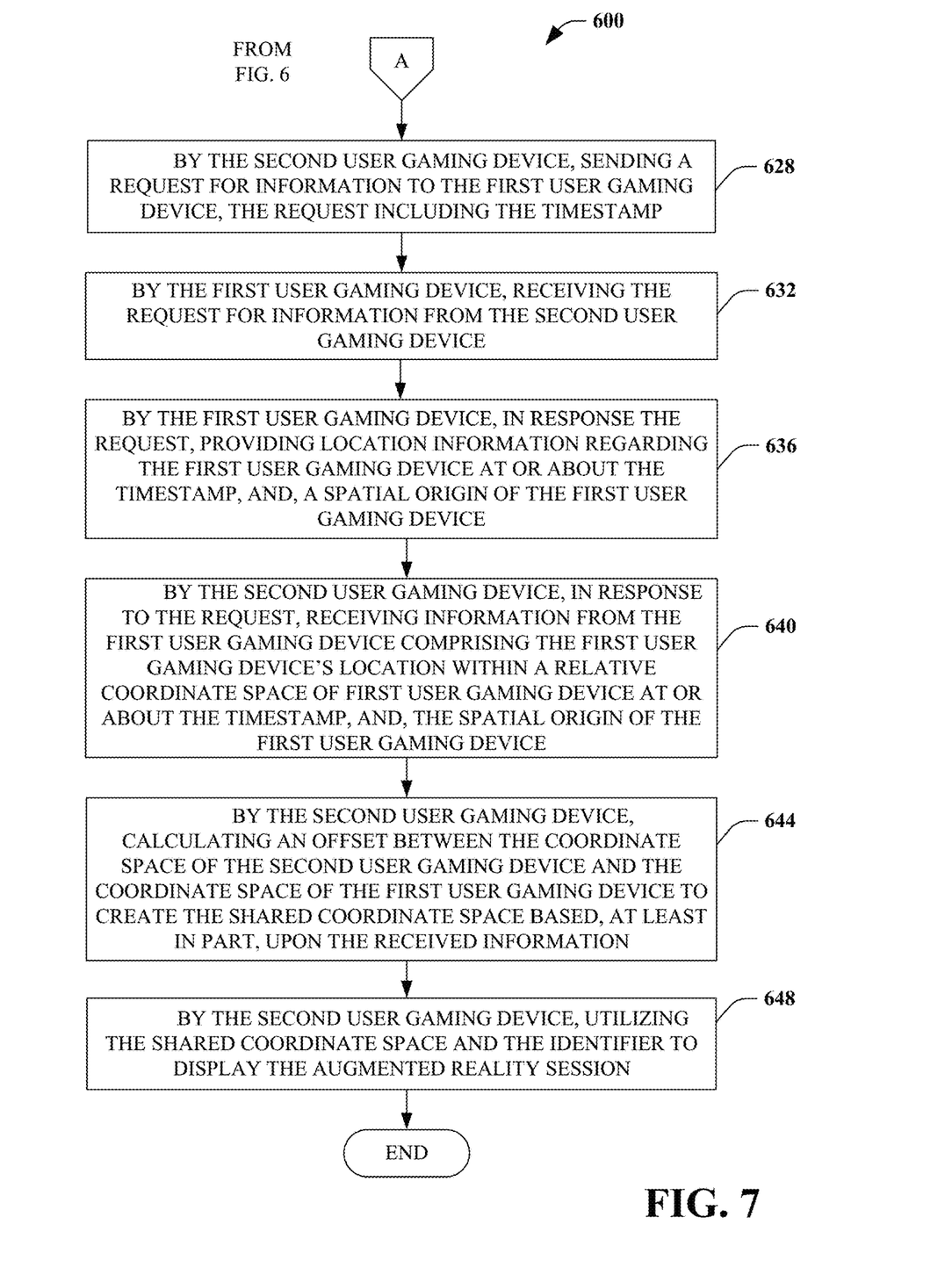

FIGS. 4-6 illustrate exemplary methodologies relating to creating a shared coordinate space in an augmented reality session between at least two devices with disjoint relative coordinate spaces. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Turning to FIG. 4, a method of creating a shared coordinate space in an augmented reality session between at least two devices with disjoint relative coordinate spaces 400 is illustrated. In some embodiments, the method 400 is performed by the first user gaming device 110.

At 410, augmented reality tracking is performed to establish a relative coordinate space of the first user gaming device. At 420, the first user gaming device displays a spatial alignment image. At 430, an identifier of the augmented reality session is provided. At 440, location information regarding the first user gaming device and associated timestamps, for at least a portion of a time the spatial alignment image is displayed, are stored.

At 450, a request for information is received from the second user gaming device, the request including a timestamp. At 460, in response the request, location information regarding the first user gaming device at or about the timestamp, and, a spatial origin of the first user gaming device is provided.

Referring to FIG. 5, a method of creating a shared coordinate space in an augmented reality session between at least two devices with disjoint relative coordinate spaces 500 is illustrated. In some embodiments, the method 500 is performed by the second user gaming device 120.

At 510, augmented reality tracking is performed to establish a relative coordinate space of the second user gaming device. At 520, a spatial alignment image displayed on the first user gaming device is recognized, and, an identifier of the augmented reality session is received.

At 530, a location of the second user gaming device within the coordinate space of the second user gaming device and a timestamp associated with a clock of the second user gaming device associated with recognition of the spatial alignment image are recorded.

At 540, a request for information is sent to the first user gaming device, the request including the timestamp. At 550, in response to the request, information is received from the first user gaming device comprising the first user gaming device's location within a relative coordinate space of first user gaming device at or about the timestamp, and, a spatial origin of the first user gaming device.

At 560, an offset between the coordinate space of the second user gaming device and the coordinate space of the first user gaming device is calculated and used to create the shared coordinate space based, at least in part, upon the received information (e.g., the first user gaming device's location within the relative coordinate space of first user gaming device at or about the timestamp, and, the spatial origin of the first user gaming device). At 570, the shared coordinate space and the identifier is utilized to display the augmented reality session.

Next, referring to FIG. 6, a method of creating a shared coordinate space in an augmented reality session between at least two devices with disjoint relative coordinate spaces 600 is illustrated. In some embodiments, the method 600 is performed by the system 100.

At 604, by the first user gaming device and the second user gaming device, augmented reality tracking is performed to establish separate relative coordinate spaces of the first user gaming device and the second user gaming device.

At 608, an identifier of the augmented reality session is provided by the first user gaming device. At 612, a spatial alignment image is displayed by the first user gaming device. At 616, location information regarding the first user gaming device (e.g., locations within the relative coordinate space of the first user gaming device), and, associated timestamps for at least a portion of a time the spatial alignment image is displayed by the first user gaming device is stored by the first user gaming device.

At 620, the spatial alignment image displayed on the first user gaming device is recognized by the second user gaming device. The identifier of the augmented reality session is further received by the second user gaming device.

At 624, a location of the second user gaming device within the coordinate space of the second user gaming device and a timestamp associated with a clock of the second user gaming device associated with recognition of the spatial alignment image is recorded by the second user gaming device. At 628, by the second user gaming device, sending a request for information is sent to the first user gaming device by the second user gaming device. The request includes the timestamp.

At 632, the request for information from the second user gaming device is received by the first user gaming device. At 636, in response the request, the first user gaming device provides (to the second user gaming device) location information regarding the first user gaming device at or about the timestamp, and, a spatial origin of the first user gaming device.

At 640, by the second user gaming device, in response to the request, information is received from the first user gaming device comprising the first user gaming device's location within a relative coordinate space of first user gaming device at or about the timestamp, and, the spatial origin of the first user gaming device. At 644, the second user gaming device calculates an offset between the coordinate space of the second user gaming device and the coordinate space of the first user gaming device to create the shared coordinate space based, at least in part, upon the received information (e.g., the first user gaming device's location within the relative coordinate space of first user gaming device at or about the timestamp, and, the spatial origin of the first user gaming device). At 648, the second user gaming device utilizes the shared coordinate space and the identifier to display/engage in the augmented reality session.

Described herein is a system for creating a shared coordinate space in an augmented reality session between a first user gaming device and a second user gaming device, comprising: a computer comprising a processor and a memory having computer-executable instructions stored thereupon which, when executed by the processor, cause the computer to: by the second user gaming device: perform augmented reality tracking to establish a relative coordinate space of the second user gaming device; recognize a spatial alignment image displayed on the first user gaming device and receive an identifier of the augmented reality session; record a location of the second user gaming device within the coordinate space of the second user gaming device and a timestamp associated with a clock of the second user gaming device associated with recognition of the spatial alignment image; send a request for information to the first user gaming device, the request including the timestamp; in response to the request, receive information from the first user gaming device comprising the first user gaming device's location within a relative coordinate space of first user gaming device at or about the timestamp, and, a spatial origin of the first user gaming device; calculate an offset between the coordinate space of the second user gaming device and the coordinate space of the first user gaming device to create the shared coordinate space based, at least in part, upon the received information; and utilize the shared coordinate space and the identifier to display the augmented reality session.

The system can further include wherein the spatial alignment image is displayed at a predetermined size and with a plurality of features comprising a predefined specific groupings of pixels of predefined colors and predefined intensities that allow the second user gaming device to determine its location in six degrees of position relative to the first user gaming device. The system can include the memory having further computer-executable instructions stored thereupon which, when executed by the processor, cause the computer to: synchronize the clock of the second user gaming device to a clock of the first user gaming device.

The system can further include wherein the session identifier is displayed on the first user gaming device and comprises a multi-dimensional barcode. The system can further include wherein the augmented reality session comprises a multi-party augmented reality building video game. The system can include the memory having further computer-executable instructions stored thereupon which, when executed by the processor, cause the computer to: display a virtual object associated with the augmented reality session. The system can further include wherein the second user gaming device comprises a mobile phone.

Described herein is a method of creating a shared coordinate space in an augmented reality session between a first user gaming device and a second user gaming device, each initially with disjoint relative coordinate spaces, comprising: by the first user gaming device and the second user gaming device, performing augmented reality tracking to establish separate relative coordinate spaces of the first user gaming device and the second user gaming device; by the first user gaming device, providing an identifier of the augmented reality session; by the first user gaming device, displaying a spatial alignment image; by the first user gaming device, storing location information regarding the first user gaming device and associated timestamps for at least a portion of a time the spatial alignment image is displayed; by the second user gaming device, recognizing the spatial alignment image displayed on the first user gaming device and receiving the identifier of the augmented reality session; by the second user gaming device, recording a location of the second user gaming device within the coordinate space of the second user gaming device and a timestamp associated with a clock of the second user gaming device associated with recognition of the spatial alignment image; by the second user gaming device, sending a request for information to the first user gaming device, the request including the timestamp; by the first user gaming device, receiving the request for information from the second user gaming device, the request including the timestamp; by the first user gaming device, in response the request, providing location information regarding the first user gaming device at or about the timestamp, and, a spatial origin of the first user gaming device; by the second user gaming device, in response to the request, receiving information from the first user gaming device comprising the first user gaming device's location within a relative coordinate space of first user gaming device at or about the timestamp, and, the spatial origin of the first user gaming device; by the second user gaming device, calculating an offset between the coordinate space of the second user gaming device and the coordinate space of the first user gaming device to create the shared coordinate space based, at least in part, upon the received information; and by the second user gaming device, utilizing the shared coordinate space and the identifier to display the augmented reality session.

The method can further include wherein the spatial alignment image is displayed at a predetermined size and with a plurality of features comprising a predefined specific groupings of pixels of predefined colors and predefined intensities that allow the second user gaming device to determine its location in six degrees of position relative to the first user gaming device. The method can further include synchronizing the clock of the second user gaming device to a clock of the first user gaming device. The method can further include wherein the session identifier is displayed on the first user gaming device and comprises a multi-dimensional barcode.

The method can further include wherein the augmented reality session comprises a multi-party augmented reality building video game. The method can further include displaying a virtual object associated with the augmented reality session on the first user gaming device and the second user gaming device. The method can further include wherein the first user gaming device and the second user gaming device comprise mobile phones.

Described herein is a computer storage media storing computer-readable instructions that when executed cause a computing device to: by a first user gaming device: perform augmented reality tracking to establish a relative coordinate space of the first user gaming device; display a spatial alignment image; provide an identifier of an augmented reality session; store location information regarding the first user gaming device and associated timestamps for at least a portion of a time the spatial alignment image is displayed; receive a request for information from the second user gaming device, the request including a timestamp; and in response the request, provide location information regarding the first user gaming device at or about the timestamp, and, a spatial origin of the first user gaming device.

The computer storage media can further include wherein the spatial alignment image is displayed at a predetermined size and with a plurality of features comprising predefined specific groupings of pixels of predefined colors and predefined intensities that allow the second user gaming device to determine its location in six degrees of position relative to the first user gaming device. The computer storage media can store further computer-readable instructions that when executed cause a computing device to: synchronize the clock of the second user gaming device to a clock of the first user gaming device.

The computer storage media can further include wherein the session identifier is displayed on the first user gaming device and comprises a multi-dimensional barcode. The computer storage media can further include wherein the augmented reality session comprises a multi-party augmented reality building video game. The computer storage media can store further computer-readable instructions that when executed cause a computing device to: display a virtual object associated with the augmented reality session on the first user gaming device.

Figure 8:
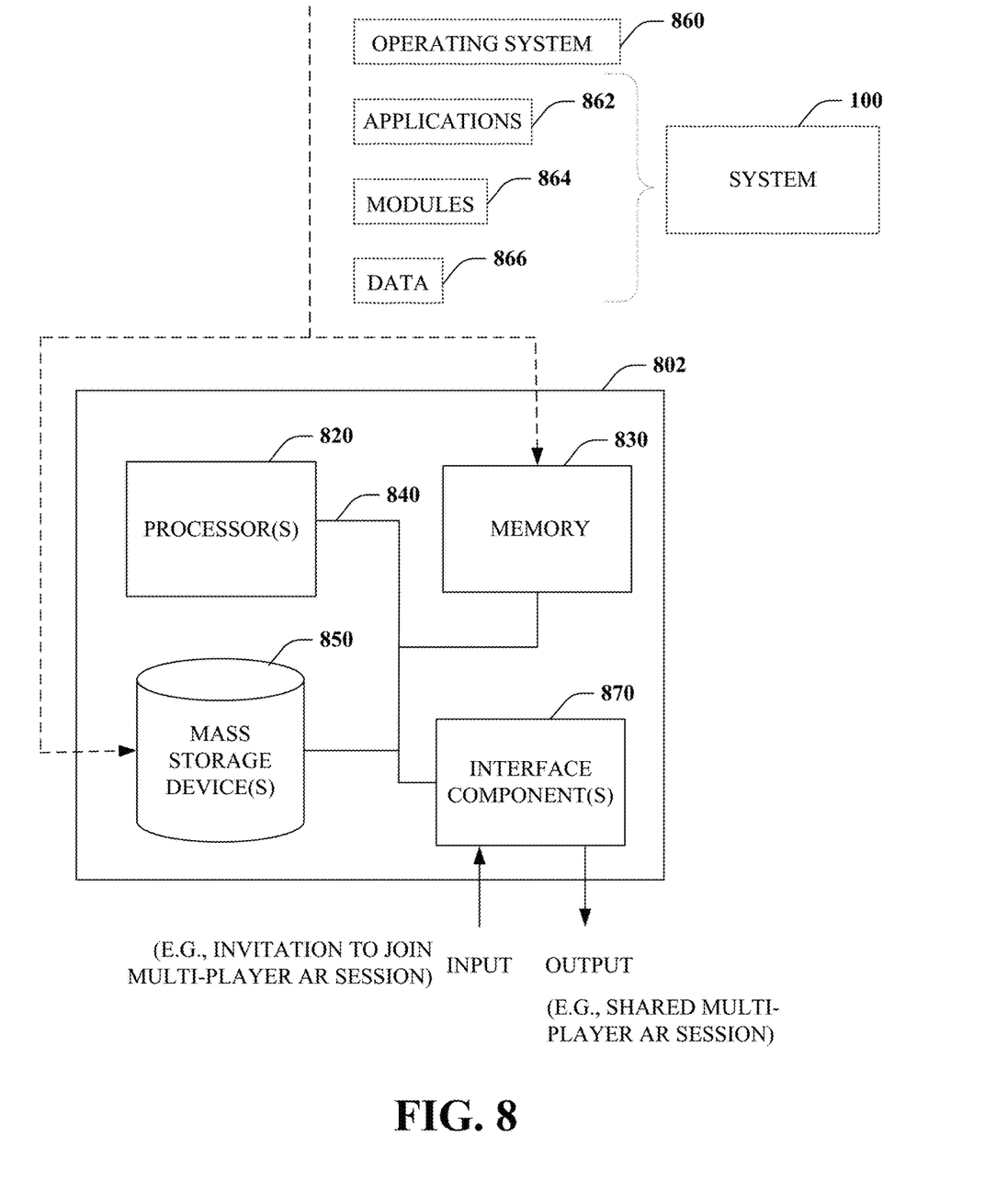
FIG. 8 is a functional block diagram that illustrates an exemplary computing system.

With reference to FIG. 8, illustrated is an example general-purpose computer or computing device 802 (e.g., mobile phone, desktop, laptop, tablet, watch, server, handheld, programmable consumer or industrial electronics, set-top box, game system, compute node, etc.). For instance, the computing device 802 may be used in a system for creating a shared coordinate space in an augmented reality session between at least two devices 100.

The computer 802 includes one or more processor(s) 820, memory 830, system bus 840, mass storage device(s) 850, and one or more interface components 870. The system bus 840 communicatively couples at least the above system constituents. However, it is to be appreciated that in its simplest form the computer 802 can include one or more processors 820 coupled to memory 830 that execute various computer executable actions, instructions, and or components stored in memory 830. The instructions may be, for instance, instructions for implementing functionality described as being carried out by one or more components discussed above or instructions for implementing one or more of the methods described above.

The processor(s) 820 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 820 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 820 can be a graphics processor.

The computer 802 can include or otherwise interact with a variety of computer-readable media to facilitate control of the computer 802 to implement one or more aspects of the claimed subject matter. The computer-readable media can be any available media that can be accessed by the computer 802 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM), etc.), magnetic storage devices (e.g., hard disk, floppy disk, cassettes, tape, etc.), optical disks (e.g., compact disk (CD), digital versatile disk (DVD), etc.), and solid state devices (e.g., solid state drive (SSD), flash memory drive (e.g., card, stick, key drive) etc.), or any other like mediums that store, as opposed to transmit or communicate, the desired information accessible by the computer 802. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 830 and mass storage device(s) 850 are examples of computer-readable storage media. Depending on the exact configuration and type of computing device, memory 830 may be volatile (e.g., RAM), non-volatile (e.g., ROM, flash memory, etc.) or some combination of the two. By way of example, the basic input/output system (BIOS), including basic routines to transfer information between elements within the computer 802, such as during start-up, can be stored in nonvolatile memory, while volatile memory can act as external cache memory to facilitate processing by the processor(s) 820, among other things.

Mass storage device(s) 850 includes removable/non-removable, volatile/non-volatile computer storage media for storage of large amounts of data relative to the memory 830. For example, mass storage device(s) 850 includes, but is not limited to, one or more devices such as a magnetic or optical disk drive, floppy disk drive, flash memory, solid-state drive, or memory stick.

Memory 830 and mass storage device(s) 850 can include, or have stored therein, operating system 860, one or more applications 862, one or more program modules 864, and data 866. The operating system 860 acts to control and allocate resources of the computer 802. Applications 862 include one or both of system and application software and can exploit management of resources by the operating system 860 through program modules 864 and data 866 stored in memory 830 and/or mass storage device (s) 850 to perform one or more actions. Accordingly, applications 862 can turn a general-purpose computer 802 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, system 100 or portions thereof, can be, or form part, of an application 862, and include one or more modules 864 and data 866 stored in memory and/or mass storage device (s) 850 whose functionality can be realized when executed by one or more processor(s) 820.

In accordance with one particular embodiment, the processor(s) 820 can correspond to a system on a chip (SOC) or like architecture including, or in other words integrating, both hardware and software on a single integrated circuit substrate. Here, the processor(s) 820 can include one or more processors as well as memory at least similar to processor(s) 820 and memory 830, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in a SOC architecture.

The computer 802 also includes one or more interface components 870 that are communicatively coupled to the system bus 840 and facilitate interaction with the computer 802. By way of example, the interface component 870 can be a port (e.g., serial, parallel, PCMCIA, USB, FireWire, etc.) or an interface card (e.g., sound, video, etc.) or the like.

In one example implementation, the interface component 870 can be embodied as a user input/output interface to enable a user to enter commands and information into the computer 802, for instance by way of one or more gestures or voice input, through one or more input devices (e.g., pointing device such as a mouse, trackball, stylus, touch pad, keyboard, microphone, joystick, game pad, satellite dish, scanner, camera, other computer, etc.). In another example implementation, the interface component 870 can be embodied as an output peripheral interface to supply output to displays (e.g., LCD, LED, plasma, etc.), speakers, printers, and/or other computers, among other things. Still further yet, the interface component 870 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A second device, comprising:
a computer comprising a processor; and
a memory having computer-executable instructions stored thereupon which, when executed by the processor, cause the second device to:
perform augmented reality tracking to establish a relative coordinate space of the second device;
recognize a spatial alignment image displayed on a first device and receive an identifier of an augmented reality session;
record a location of the second device within the relative coordinate space of the second device and a timestamp associated with a clock of the second device, the timestamp indicating when the second device recognized the spatial alignment image displayed by the first device;
send a request for information to the first device, the request including the timestamp indicating when the second device recognized the spatial alignment image displayed by the first device;
receive information from the first device responsive to the request, the received information comprising a spatial origin of the first device and the first device's location within a relative coordinate space of first device at or about the timestamp indicating when the second device recognized the spatial alignment image displayed by the first device;
calculate an offset between the relative coordinate space of the second device and the relative coordinate space of the first device to determine a shared coordinate space based, at least in part, upon the received information; and
utilize the shared coordinate space and the identifier to display the augmented reality session.

2. The second device of claim 1, wherein the spatial alignment image is displayed by the first device at a predetermined size and with a plurality of features comprising predefined specific groupings of pixels of predefined colors and predefined intensities that allow the second device to determine its location in six degrees of position relative to the first device.

3. The second device of claim 1, the memory having further computer-executable instructions stored thereupon which, when executed by the processor, cause the second device to:
synchronize the clock of the second device to a clock of the first device.

4. The second device of claim 1, wherein the identifier of the augmented reality session comprises a multi-dimensional barcode.

5. The second device of claim 1, wherein the augmented reality session comprises a multi-party augmented reality building video game.

6. The second device of claim 1, the memory having further computer-executable instructions stored thereupon which, when executed by the processor, cause the second device to:
display a virtual object associated with the augmented reality session.

7. The second device of claim 1, wherein the second device comprises a mobile phone.

8. A method performed by a first device, the method comprising:
performing augmented reality tracking to establish a relative coordinate space of the first device;
displaying a spatial alignment image;
storing location information regarding the first device and associated timestamps for at least a portion of a time the spatial alignment image is displayed;
receiving a timestamp indicating when a second device recognized the spatial alignment image displayed by the first device; and
providing, to the second device, location information regarding the first device at or about the timestamp, and, a spatial origin of the first device.

9. The method of claim 8, wherein the spatial alignment image is displayed at a predetermined size and with a plurality of features comprising predefined specific groupings of pixels of predefined colors and predefined intensities that allow the second device to determine its location in six degrees of position relative to the first device.

10. The method of claim 8, further comprising:
synchronizing a clock of the first device to a clock of the second device.

11. The method of claim 8, further comprising:
providing a session identifier of an augmented reality session to the second device.

12. The method of claim 11, wherein the augmented reality session comprises a multi-party augmented reality building video game involving the first device and the second device interacting within a shared coordinate space.

13. The method of claim 12, further comprising:
displaying a virtual object associated with the augmented reality session on the first.

14. The method of claim 8, wherein the first device comprises a mobile phone.

15. A computer storage media storing computer-readable instructions that, when executed, cause a first device to:
perform augmented reality tracking to establish a relative coordinate space of the first device;
display a spatial alignment image;
store location information regarding the first device and associated first timestamps for at least a portion of a time the spatial alignment image is displayed;
receive a request for information from a second device, the request including a second timestamp indicating when the second device recognized the spatial alignment image displayed by the first device; and
in response the request, provide location information regarding the first device at or about the second timestamp, and, a spatial origin of the first device.

16. The computer storage media of claim 15, wherein the spatial alignment image is displayed at a predetermined size and with a plurality of features comprising predefined specific groupings of pixels of predefined colors and predefined intensities that allow the second device to determine its location in six degrees of position relative to the first device.

17. The computer storage media of claim 15, storing further computer-readable instructions that, when executed, cause the first device to:
synchronize a clock of the first device to a clock of the second device.

18. The computer storage media of claim 15, wherein the location information is usable by the second device to create a shared coordinate space for an augmented reality session involving the first device and the second device.

19. The computer storage media of claim 18, wherein the augmented reality session comprises a multi-party augmented reality building video game.

20. The computer storage media of claim 18, storing further computer-readable instructions, that when, executed cause the first device to:
display a virtual object associated with the augmented reality session.

* * * * *